(12) United States Patent
Suzuki et al.

(10) Patent No.: US 8,858,142 B2
(45) Date of Patent: Oct. 14, 2014

(54) EARTH BOLT

(75) Inventors: Nobuhide Suzuki, Kawasaki (JP); Nobuyoshi Suzuki, Isehara (JP); Mitsunari Ono, Fujisawa (JP)

(73) Assignee: Iwata Bolt Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/004,498

(22) PCT Filed: Apr. 4, 2012

(86) PCT No.: PCT/JP2012/059220
§ 371 (c)(1),
(2), (4) Date: Dec. 4, 2013

(87) PCT Pub. No.: WO2012/137831
PCT Pub. Date: Oct. 11, 2012

(65) Prior Publication Data
US 2014/0079510 A1 Mar. 20, 2014

(30) Foreign Application Priority Data
Apr. 5, 2011 (JP) ................................. 2011-083662

(51) Int. Cl.
*F16B 39/28* (2006.01)
*F16B 33/02* (2006.01)
*F16B 35/06* (2006.01)
*F16B 1/00* (2006.01)

(52) U.S. Cl.
CPC ................. *F16B 33/02* (2013.01); *F16B 35/06* (2013.01); *F16B 2001/0064* (2013.01)

USPC ............................ 411/184; 411/185; 411/187

(58) Field of Classification Search
USPC ........... 411/81, 172, 176, 181, 183, 184, 185, 411/187, 188, 369, 408, 417, 510
See application file for complete search history.

(56) References Cited

U.S. PATENT DOCUMENTS

| | | | | |
|---|---|---|---|---|
| 1,968,516 A | * | 7/1934 | Dieter | 411/399 |
| 1,969,796 A | * | 8/1934 | Hoke | 411/366.1 |
| 2,056,688 A | * | 10/1936 | Peterka et al. | 411/399 |
| 2,210,455 A | * | 8/1940 | Hosking | 411/187 |
| 3,426,642 A | * | 2/1969 | Phipard, Jr. | 411/417 |

(Continued)

FOREIGN PATENT DOCUMENTS

| | | |
|---|---|---|
| JP | A 5-284625 | 10/1993 |
| JP | U 6-9176 | 2/1994 |

(Continued)

OTHER PUBLICATIONS

Jul. 3, 2012 Search Report issued in International Patent Application No. PCT/JP2012/059220 (with translation).

*Primary Examiner* — Roberta Delisle
(74) *Attorney, Agent, or Firm* — Oliff PLC

(57) ABSTRACT

An earth bolt is capable of achieving electrical connection and watertight sealing and of holding fragment of a coating so that the fragments of coating may not be scattered. The earth bolt can be electrically connected to a member coated with an insulating film. The earth bolt has a head and a threaded body. The head is provided on its bearing surface with an annular ridge protruding from the bearing surface of the head so as to coaxially surround the threaded body and capable of scraping off the insulating film.

8 Claims, 7 Drawing Sheets

(56) References Cited

U.S. PATENT DOCUMENTS

| | | | | |
|---|---|---|---|---|
| 4,223,711 | A | * | 9/1980 | Tabor .................... 411/188 |
| 4,290,469 | A | * | 9/1981 | Nakae .................... 411/185 |
| 4,310,272 | A | * | 1/1982 | Rich et al. ............... 411/185 |
| 4,490,083 | A | * | 12/1984 | Rebish ................... 411/338 |
| 4,518,294 | A | * | 5/1985 | Barth ..................... 411/188 |
| 4,749,319 | A | * | 6/1988 | Sygnator ................. 411/188 |
| 4,749,321 | A | * | 6/1988 | Knohl et al. ............ 411/371.1 |
| 4,875,818 | A | * | 10/1989 | Reinwall ................. 411/369 |
| 5,487,633 | A | * | 1/1996 | Roberts .................. 411/387.3 |
| 6,135,689 | A | | 10/2000 | Matsunami |
| 6,447,227 | B1 | * | 9/2002 | Crutchley ................ 411/69 |
| 7,306,418 | B2 | * | 12/2007 | Kornblum ............... 411/352 |
| 7,462,043 | B2 | * | 12/2008 | Deisenhofer ............ 439/97 |
| 2006/0137166 | A1 | * | 6/2006 | Babej et al. ............. 29/509 |

FOREIGN PATENT DOCUMENTS

| | | |
|---|---|---|
| JP | A 7-286613 | 10/1995 |
| JP | A 8-334112 | 12/1996 |
| JP | A 10-331831 | 12/1998 |
| JP | A 2009-246740 | 10/2009 |

\* cited by examiner

EARTH BOLT

TECHNICAL FIELD

The present invention relates to an earth bolt capable of simultaneously achieving fastening an electric device to a body structure of an automobile or the like and electrically connecting the electric device to the body structure.

BACKGROUND ART

An earth bolt is used for both fastening an electric device to a body structure of an automobile or the like and electrically connecting the electric device to the body structure.

A fastening method using a conventional earth bolt needs the following steps and cost.

The method removes part of a coating on a frame and attaches an earth plate with a bolt. Another method of connecting an earth terminal to a flame with a bolt having a notched screw thread scrapes the coating off by screwing the bolt into an internal screw thread formed in the frame.

When such a conventional earth bolt is used, the following problems arise. Work for removing the coating and masking parts needs man-hours and deteriorates workability. Use of the earth terminal, a wire and a plate increases the cost. In most cases, several fastening bolts are used, which increase the cost still further.

The conventional method of attaching an electric device to a body structure of an automobile or the like fastens the electric device to the body structure such that the electric device is electrically connected to the body structure and the joint of the electric device and the body structure is watertight. A method mentioned in JP 2009-246740 A electrically connects an electric device to a body structure by pressing a pad serving as a grounding electrode against the body structure and ensures a watertight joint by preventing water infiltration with a ridge not for electrical connection.

Patent Document: JP2009-246740A

DISCLOSURE OF THE INVENTION

Problem to be Solved by the Invention

To achieve both electrical connection and watertight sealing simultaneously by using the conventional earth bolt, the following problems arise.

Since the conventional earth bolt has an electrically connecting function and a watertight sealing function separately, electrical connection and watertight sealing are achieved separately and cannot simultaneously be achieved.

Accordingly, it is an object of the present invention to provide an earth bolt capable of simultaneously achieving fastening, electrical connection and watertight sealing, and of holding removed fragments of a coating such that the fragments of the coating may not be scattered.

Means for Solving the Problem

The present invention provides an earth bolt capable of being electrically connected to a member coated with an insulating film, having a threaded body, a head having a bearing surface, and an annular ridge formed on the bearing surface of the head so as to surround the threaded body partly.

When the earth bolt is turned for tightening, the annular ridge protruding from the bearing surface of the head fractures and removes part of the insulating film coating the member and comes into electrical contact with the member.

The continuous annular ridge can seal a part inside the annular ridge in a watertight fashion.

BEST MODE FOR CARRYING OUT THE INVENTION

An earth bolt 1 in a first embodiment of the present invention will be described with reference to FIGS. 1 to 4.

Figure 1:
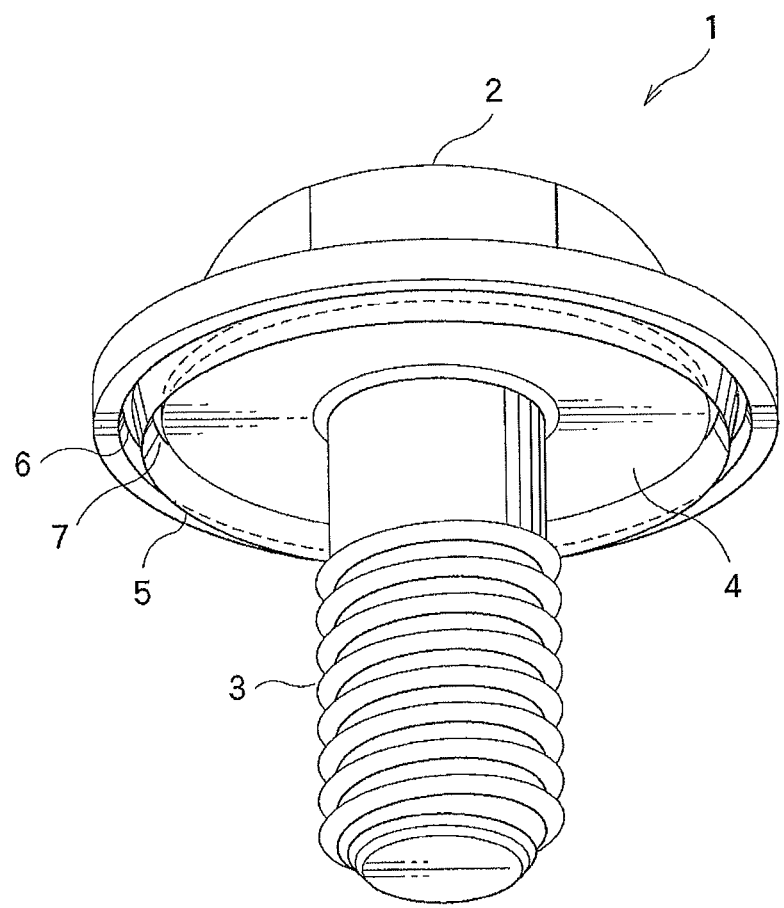
FIG. 1 is a perspective view of an earth bolt in a first embodiment of the present invention.
Figure 2:
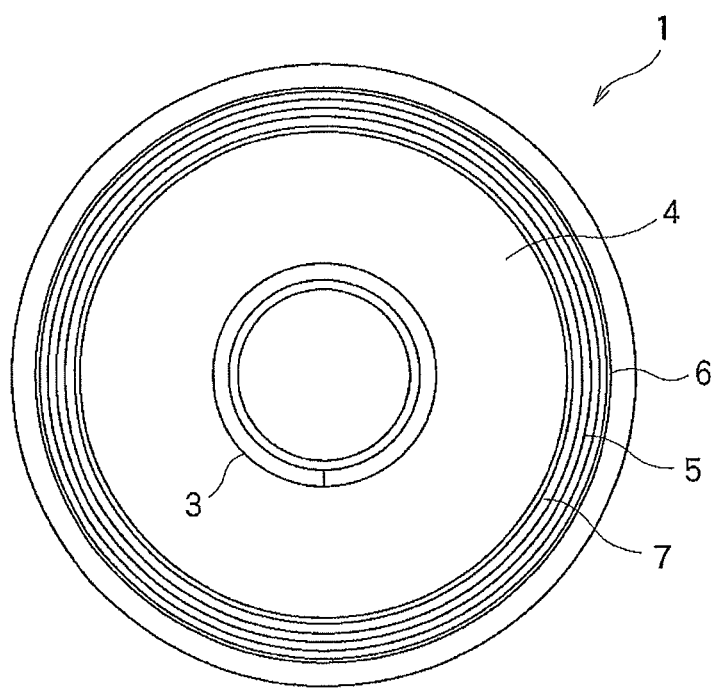
FIG. 2 is a bottom view of the earth bolt shown in FIG. 1 as viewed from under the threaded body of the earth bolt.
Figure 3:
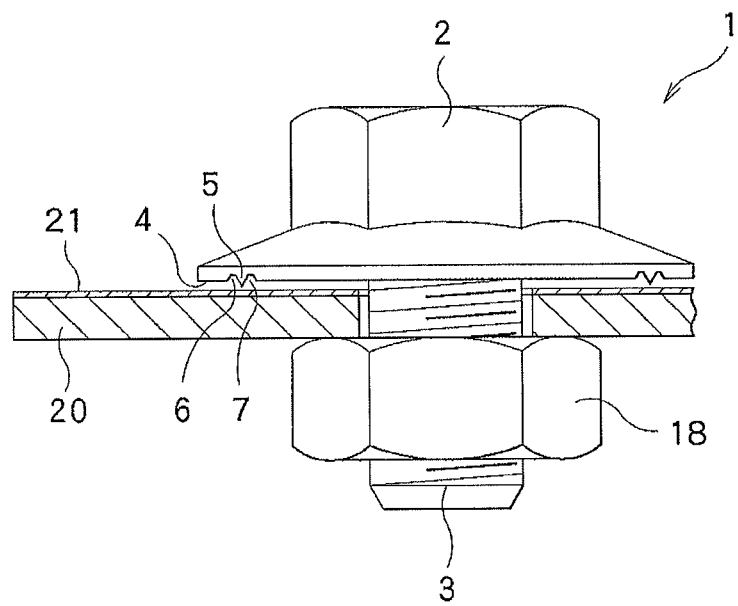
FIG. 3 is a partly sectional side elevation of the earth bolt shown in FIG. 1.

Referring to FIGS. 1, 2 and 3, the earth bolt 1 is electrically connected to a member 20 coated with an insulating film 21. The earth bolt 1 has a head 2 having a bearing surface, and a threaded body 3. A continuous annular ridge 5 is formed on the bearing surface of the head 2 so as to surround an upper part of the threaded body 3. The member 20 is made of a metal and is coated with the insulating film 21. The earth bolt 1 is made of a metal.

FIG. 3 shows the positional relation between the earth bolt 1 and the member 20 coated with the insulating film 21. When the earth bolt 1 is screwed into a nut 18, the continuous annular ridge 5 is pressed against the insulating film 21. As the earth bolt 1 is screwed further into the nut 18, part of the insulating film 21 in contact with the annular ridge 5 is fractured and removed.

Figure 4:
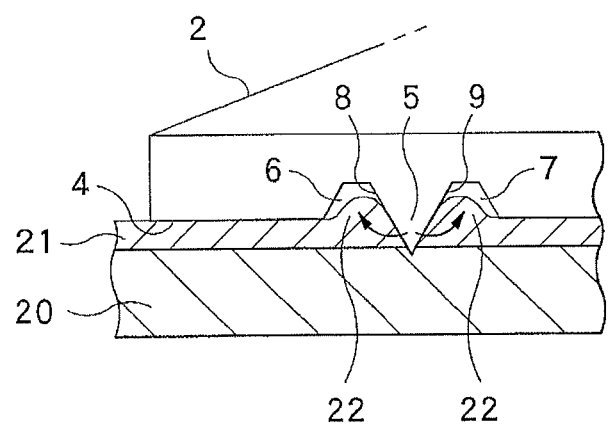
FIG. 4 is a fragmentary side elevation of the earth bolt shown in FIG. 1 for assistance in explaining the function of the earth bolt shown in FIG. 1.

As shown in FIG. 4, a first annular groove 6 is formed contiguously with the annular ridge 5 in the bearing surface 4 on the outer side of the annular ridge 5, and a second annular groove 7 is formed contiguously with the annular ridge 5 in the bearing surface 4 on the inner side of the annular ridge 5. The first annular groove 6 and the second annular groove 7 have a trapezoidal cross section expanding downward.

The annular ridge 5 has a triangular cross section. The triangular cross section has a first side 8 and a second side 9 diverging from the vertex of the triangular cross section. The first side 8 and the second side 9 are on the outer side and on the inner side, respectively, with respect to the axis of the threaded body 3. The first side 8 is the generator of the inner slope of the first annular groove 6. The second side 9 is the generator of the outer slope of the second annular groove 7.

Referring to FIG. 4, the annular ridge 5 comes into direct contact with the member 20 and the earth bolt 1 is electrically connected to the member 20 when part of the insulating film 21 is scraped off by the annular ridge 5. At the same time, a space extending inside the annular ridge 5 is sealed in a watertight fashion because the annular ridge 5 is continuous.

Removed fragments 22 of the insulating film 21 scraped off by the annular ridge 5 from the insulating film 21 are guided by the first side 8 and the second side 9 of the annular ridge 5 into the first annular groove 6 and the second annular groove 7, respectively.

Since the annular ridge 5 protrudes from the bearing surface 4, the annular ridge 5 presses and scrapes off the insulating film 21 coating the member 20 and comes into electrical contact with the member 20 when the earth bolt 1 is tightened. Since the annular groove 5 is continuous and surrounds the threaded body 3, the space inside the annular ridge 5 can be sealed in a watertight fashion.

The first annular groove 6 formed contiguously with the outer side of the annular ridge 5 in the bearing seat 4 can hold the fragments 22 of the insulating film 21 scraped off by the annular ridge 5. Thus, the fragments 22 of the scraped insulating film 21 can be prevented from scattering.

The second annular groove 7 formed contiguously with the inner slope of the annular ridge 5 in the bearing seat 4 can hold the fragments 22 of the insulating film 21 scraped off by the annular ridge 5. Thus, the fragments 22 of the insulating film 21 scraped off by the annular ridge 5 can be securely held on the inner and the outer side of the annular ridge 5.

The annular ridge 5 has a triangular cross section. The first side 8 and the second side 9 diverging from the vertex of the triangular cross section are the generators of the inner slope of the first annular groove 6 and the outer slope of the second annular groove 7, respectively. Therefore, the fragments 22 of the insulating film 21 scraped off by the annular ridge 5 are guided surely into the first annular groove 6 and the second annular groove 7 by the inner slope of the first annular groove 6 defined by the first side 8 and the outer slope of the second annular groove 7 defined by the second side 9 into the first annular groove 6 and the second annular groove 7, respectively.

Figure 5:
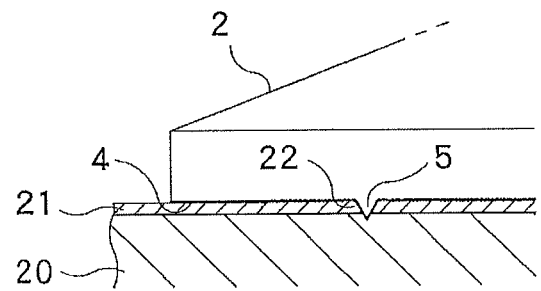
FIG. 5 is a fragmentary side elevation of an earth bolt in a second embodiment of the present invention.

An earth bolt 1 in a second embodiment of the present invention will be described with reference to FIG. 5. The earth bolt 1 has a head 2 having a bearing surface 4 and a threaded body 3. A continuous annular ridge 5 is formed on the bearing surface 4 so as to surrounds the threaded body 3 partly. The earth bolt 1 in the second embodiment does not have any parts corresponding to the first annular groove 6 and such near the annular ridge 5.

If an insulating film 21 coating the member 20 is very thin, the amount of fragments 22 of the insulating film 21 that may be scraped off is small and the fragments 22 will not cause trouble even if the fragments 22 are not restrained from scattering. In such a case, the earth bolt 1 in the second embodiment provided only with the annular ridge 5 and having a simple shape is functionally effective.

The earth bolt 1 in the second embodiment can be easily manufactured and can achieve both electrical connection and watertight sealing when the same is tightened.

Figure 6:
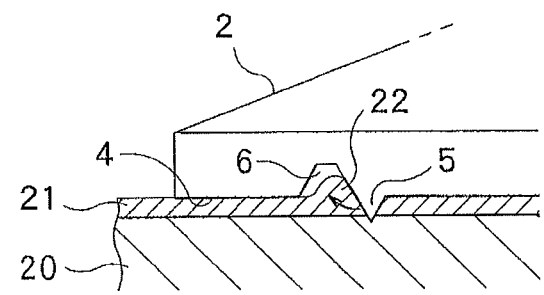
FIG. 6 is a fragmentary side elevation of an earth bolt in a third embodiment of the present invention.

An earth bolt 1 in a third embodiment of the present invention will be described with reference to FIG. 6. The earth bolt 1 in the third embodiment has a head 2 having a bearing surface 4 provided with an annular ridge 5 and a first annular groove 6, and is not provided with any part corresponding to the second annular groove shown in FIG. 3.

When the insulating film 21 coating the member 20 is comparatively thin and the amount of fragments 22 of the insulating film 21 scraped off is negligibly small, the fragments 22 of the insulating film 21 is not left uncollected and are held only in the first annular groove 6.

The earth bolt 1 in the third embodiment can be comparatively easily manufactured, can achieve both electrical connection and watertight sealing when the same is tightened, and can hold the fragments 22 of the scraped insulating film 21 in the first annular groove 6.

Figure 7:
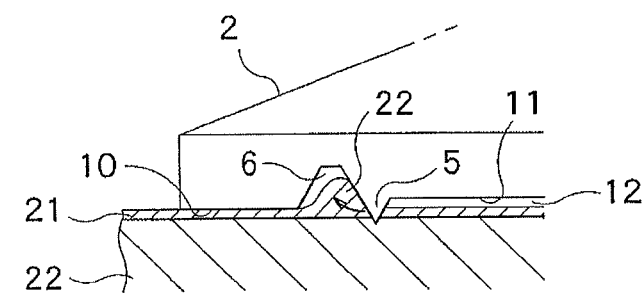
FIG. 7 is a fragmentary side elevation of an earth bolt in a fourth embodiment of the present invention.

An earth bolt 1 in a fourth embodiment of the present invention will be described with reference to FIG. 7. The earth bolt 1 in the fourth embodiment has a head 2 having a bearing surface provided with an annular ridge 5, and a threaded body 3. A first annular groove 6 is formed in the bearing surface of the head 2. The bearing surface has an outer part 10 extending on the outer side of the first annular groove 6 and an inner part 11 extending on the inner side of the first annular groove 6. The outer part 10 has a height with respect to a direction toward a plane perpendicular to the axis of the threaded body 3 and containing the tip of the threaded body 3 higher than that of the inner part 11. Therefore, a gap 12 is formed between the inner part 11 of the bearing surface 2 and an insulating film 21 when the earth bolt 1 is tightened.

When the earth bolt 1 is screwed down, the outer part 10 of the bearing surface extending outside the annular ridge 5 and the first annular groove 6 comes first into contact with the insulating film 21. Consequently, the wide outer part 10 of the bearing surface presses the insulating film 21.

Thus the infiltration of moisture from outside the earth bolt 1 can be prevented. Therefore, the annular ridge 5 can surly achieve watertight sealing and the outer part 10 of the bearing surface can achieve watertight sealing still more effectively.

Figure 8:
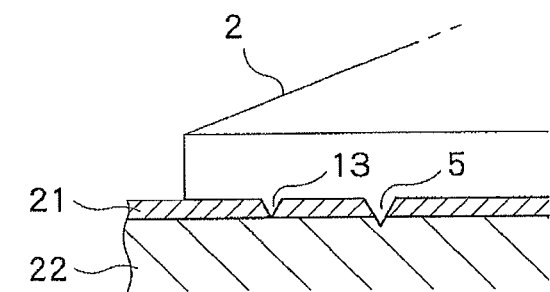
FIG. 8 is a fragmentary side elevation of an earth bolt in a fifth embodiment of the present invention.

An earth bolt 1 in a fifth embodiment of the present invention will be described with reference to FIG. 8. The earth bolt 1 in the sixth embodiment has a head 2 having a bearing surface 4. The bearing surface 4 is provided with an annular ridge 5 and a secondary annular ridge 13 surrounding the annular ridge 5. The secondary annular ridge 13 has a height lower than that of the annular ridge 5.

The secondary annular ridge 13 cuts partly or fully into the insulating film 21 to achieve watertight sealing. At the same time, the annular ridge 5 cuts fully into the insulating film 21 to ensure watertight sealing still further.

An earth bolt 15 in a six embodiment of the present invention will be described with reference to FIGS. 9 to 11.

Figure 9:
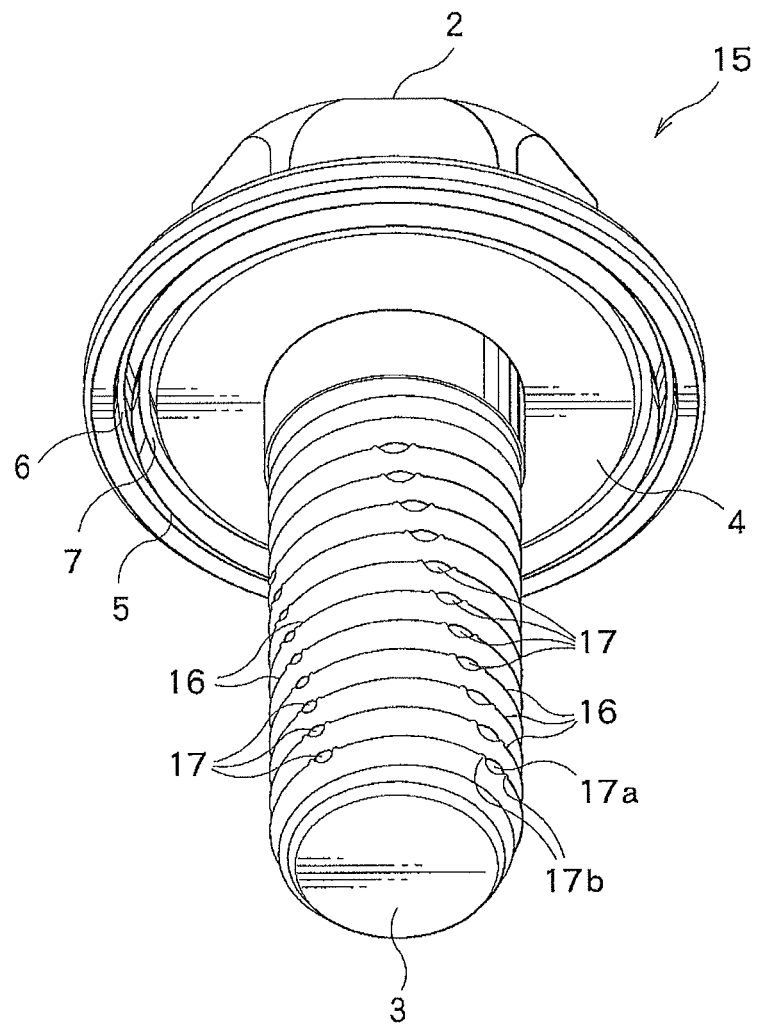
FIG. 9 is a perspective view of an earth bolt in a sixth embodiment of the present invention.
Figure 10:
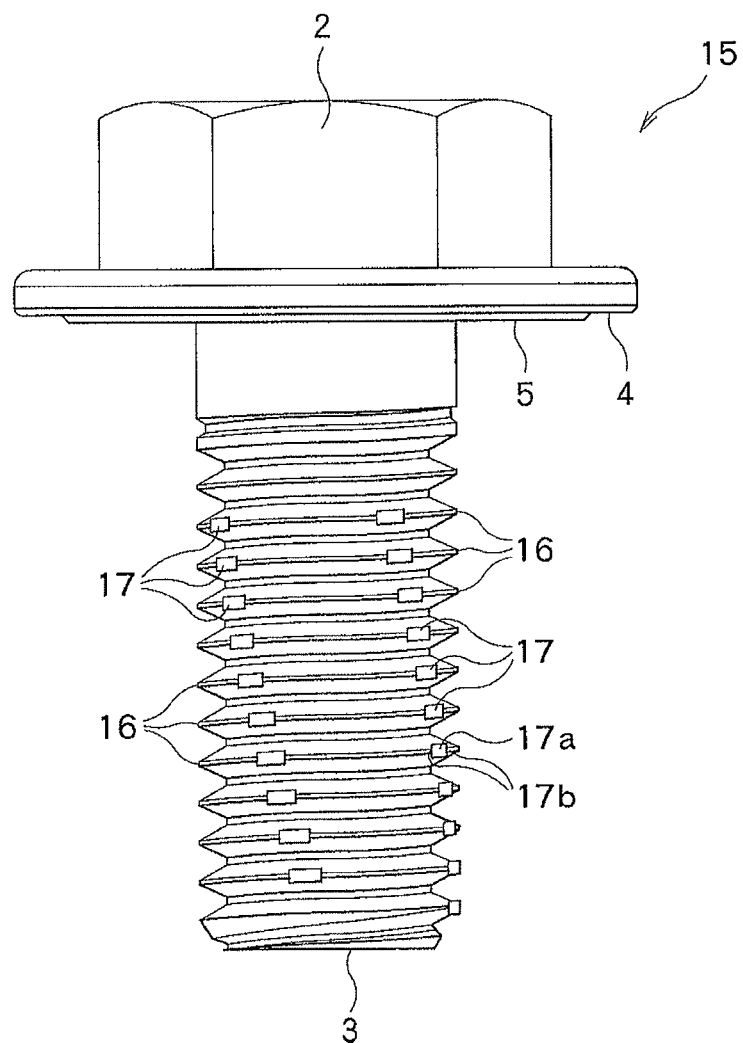
FIG. 10 is a side elevation of the earth bolt shown in FIG. 9

Referring to FIGS. 9 and 10, the earth bolt 15 in the sixth embodiment is the same in shape as the earth bolt 1 in the first embodiment, but the earth bolt 15 has a threaded body 3 having a screw thread provided with plural protrusions 17 protruding radially outward from the crest 16 of the screw thread. The protrusions 17 are formed on the crest 16 of the screw thread. Thus, the protrusions 17 are arranged on a spiral about the axis of the threaded body 3.

The plural protrusions 17 are formed at intervals on the crest 16 of each turn of the screw thread. As shown in FIGS. 9 and 10, the protrusions 17 are arranged on a spiral about the axis of the threaded body 3. The protrusions 17 are bulges 17b formed on opposite sides of each of depressions 17a formed by pressing parts of the crest 16 of the screw thread of the threaded body 3. The protrusions 17 arranged on a spiral as shown in FIGS. 9 and 10 can be easily formed by pressing parts of the crest 16 of the screw thread.

Figure 11:
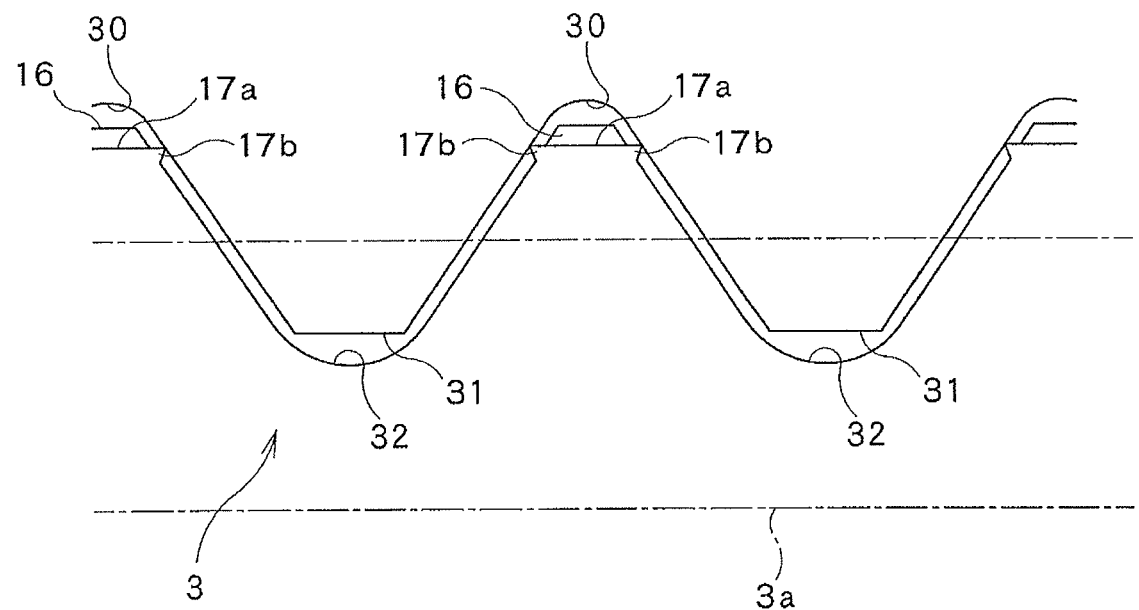
FIG. 11 is a diagrammatic view of an external screw thread formed on the earth bolt shown in FIG. 9.

FIG. 11 is an enlarged longitudinal half section of the threaded body 3 of the earth bolt 15. A member provided with an internal screw thread is shown in combination with the threaded body 3 of the earth bolt 15 in FIG. 11 to facilitate understanding. Indicated at 3a is the axis of the threaded body 3, at 32 is the root of the screw thread of the threaded body 3, at 30 is the root of the internal screw thread formed in the member, and at 31 is the crest of the internal screw thread formed in the member.

The protrusions 17 (the depressions 17a and the bulges 17b) formed on the crest of a turn of the screw thread and those formed on the crest of the adjacent turn of the screw thread are shown typically equal.

Figure 12:
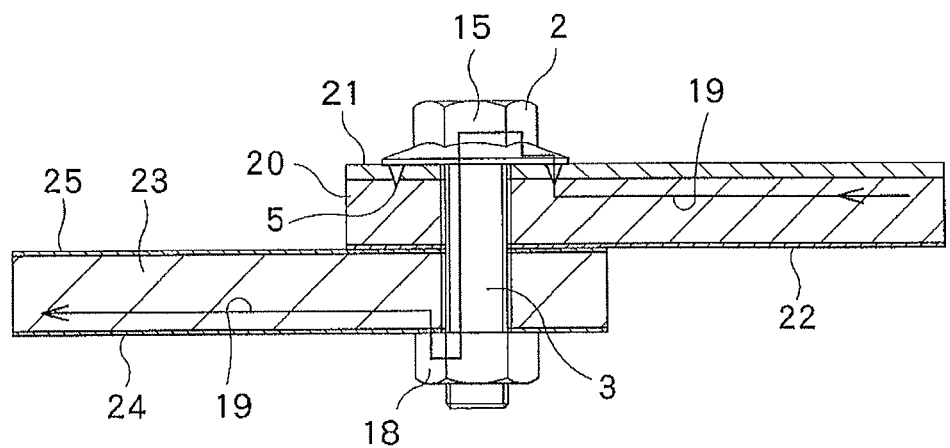
FIG. 12 is a view of assistance in explaining the use of the earth bolt shown in FIG. 9.

When the earth bolt 15 is screwed into a nut 18 shown in FIG. 12, the protrusions 17 scrape off a second insulating film formed on the internal screw thread of the nut 18.

FIG. 12 shows the earth bolt 15 in use by way of example, in which the thickness of an insulating film 21 and the height of the annular ridge 5 are exaggerated. The insulating film 21 and an insulating film 22 are formed on the opposite surfaces, respectively, of a first member 20. An outer insulating film 24 and an inner insulating film 25 are formed on the opposite surfaces, respectively, of a second member 23. The outer insulating film 24 is formed after conductively attaching a nut 18 to the second member 23 by welding and coating the outer surface of the second member 23 with an insulating material. The internal screw thread of the nut 18 is coated with an insulating film which is the same as the outer insulating film 24 during a coating process for forming the outer insulating film 24. The insulating film coating the internal thread of the nut 18 obstructs the electrical contact of the nut 18 with the threaded body 3 of the earth bolt 15.

Suppose that the first member 20 and the second member 23 are to be fastened together with the earth bolt 15 and the nut 18 under such circumstances. Suppose that the insulating film 21 of the first member 20 to be exposed to ambient conditions needs to be watertight and the first member 20 and the second member 23 need to be electrically connected. When the first member 20 and the second member 23 are brought simply into contact, the insulating films 22 and 25 prevent the electrical contact of the first member 20 with the second member 23. Since the internal screw thread of the nut 18 is coated by a coating process with the insulating film which is the same as the outer insulating film 24, the earth bolt 15 and the nut 18 cannot simply be electrically connected.

When the screw thread of the earth bolt 15 and the internal screw thread of the nut 18 are engaged, the protrusions 17 formed on the crest of the screw thread of the threaded body 3 so as to be arranged on a spiral about the axis of the threaded body 3 can surely scrape off the insulating film coating the internal screw thread of the nut 18.

The annular ridge 5 of the earth bolt 15 comes into electrical contact with the first member 20 and isolates the threaded body 3 of the earth bolt 15 from the environment of the first insulating film 21 in a watertight fashion.

The protrusions 17 scrape off the second insulating film 24 coating the internal screw thread of the nut 18 to achieve the electrical contact of the earth bolt 15 with the nut 18.

The annular ridge 5 and the first member 20 are electrically connected, the threaded body 3 and the internal thread of the nut 18 are electrically connected as indicated by an arrow 19 and the nut 18 is welded to the second member 23. Therefore, the first member 20 and the second member 23 are surely electrically connected.

Since the earth bolt 15 has the annular ridge 5 and the protrusions 17, the earth bolt 15 can achieve necessary watertight sealing of the first member 20 and the electrical connection of the first member 20 and the second member 23.

Although it is described by way of example that the earth bolt 15 in the sixth embodiment is obtained by adding the protrusions 17 to the earth bolt 1 in the first embodiment, the earth bolt 15 in the sixth embodiment may be obtained by adding the protrusions 17 to any one of the earth bolts in the second to the fifth embodiment.

The earth bolt in any one of the foregoing embodiments is provided in the bearing surface of the head with the first annular groove contiguously surrounding the annular ridge. Therefore, fragments of the insulating film scraped off by the annular ridge can be held in the first annular groove and hence the scraped fragments of the insulating film can be prevented from scattering away.

Since the earth bolt is provided in the bearing surface of the head thereof on the inner side of the annular ridge with the second annular groove formed contiguously with the annular ridge, fragments of the insulating film scraped off by the annular ridge can surely be held in the first and the second annular groove on the outer and the inner side of the annular ridge.

The first part of the bearing surface protrudes more than the second part of the bearing surface toward a plane perpendicular to the axis of the threaded body and containing the tip of the threaded body 3. Therefore, the outer part of the bearing surface can enhance the watertight sealing effect of the annular ridge still further.

The annular ridge has a triangular cross section. The triangular cross section has the first and the second side diverging from the vertex of the triangular cross section. The first side is the generator of the inner slope of the first annular groove. Therefore, fragments of the insulating film scraped off by the annular ridge can surely be guided into the first annular groove by the inner slope of the first annular groove defined by the first side.

The annular ridge has a triangular cross section. The triangular cross section has the first and the second side diverging from the vertex of the triangular cross section. The first side is the generator of the inner slope of the first annular groove and the second side is the generator of the outer slope of the second annular groove. Therefore fragments of the insulating film scraped off by the annular ridge can surely be guided into the first annular groove by the inner slope of the first annular groove defined by the first side and into the second annular groove by the outer slope of the second annular groove defined by the second side.

The head of the earth bolt is provided on its bearing surface with the annular ridge and the secondary annular ridge surrounding the annular ridge. The secondary annular ridge has a height lower than that of the annular ridge. The secondary annular ridge cuts partly or fully into the insulating film 21 to achieve watertight sealing. At the same time, the annular ridge cuts fully into the insulating film to achieve electrical contact and to ensure watertight sealing still further.

The screw thread of the threaded body is provided with the protrusions protruding radially outward from the crest of the external screw thread of the threaded body and capable of scraping off part of the second insulating film formed on the second member and coating the internal screw thread of the nut. Thus, the earth bolt can attain electrical contact with the nut. Consequently, the first and the second member fastened together by the earth bolt and the nut can be electrically connected through the annular ridge and the protrusions formed on the screw thread of the threaded body.

The protrusions are formed in the crest of each turn of the external screw thread of the threaded body and are arranged on a spiral about the axis of the threaded body. Thus, the second insulating film coating the internal screw thread of the nut can surely be removed by the protrusions formed in the crest of the screw thread of the threaded body.

The protrusions are formed by pressing parts of the crest of the screw thread so as to protrude radially outward on the opposite sides of each of the pressed parts. Thus, the protrusions can easily be formed simply by pressing parts of the crest of the external screw thread.

The invention claimed is:

1. An earth bolt capable of coming into electrical contact with a member coated with an insulating film, said earth bolt having a head and a threaded body, wherein an annular ridge capable of scraping off the insulating film is formed in the bearing surface of the head so as to surround the threaded body, wherein a first annular groove capable of holding fragments of the insulating film scraped off by the annular ridge is formed in the bearing surface of the head contiguously with the outer side of the annular ridge, the threaded body is provided with protrusions protruding radially outward from the crests of turns of the screw thread and capable of scraping off a second insulating film coating the internal screw thread of a nut with which the threaded body is to be engaged and when the earth bolt is turned for tightening, the annular ridge protruding from the bearing surface of the head fractures and removes part of the insulating film coating the member and the continuous annular ridge seals a part inside the annular ridge in a watertight fashion.

2. The earth bolt according to claim 1, wherein a second annular groove capable of holding fragments of the insulating film scraped off by the annular ridge is formed in the bearing surface of the head contiguously with the inner side of the annular ridge.

3. The earth bolt according to claim 2, wherein the annular ridge has a triangular cross section, a second side of the triangular cross section on the other side of the vertex of the triangular cross section is the generator of the outer slope of the second annular groove.

4. The earth bolt according to claim 1, wherein an outer part of the bearing surface extending outside the first annular groove protrudes more than an inner part of the bearing surface extending inside the first annular groove toward a plane perpendicular to the axis of the threaded body and containing the tip of the threaded body.

5. The earth bolt according to claim 1, wherein the annular ridge has a triangular cross section, a first side of the triangular cross section on one side of the vertex of the triangular cross section is the generator of the inner slope of the first annular groove.

6. The earth bolt according to claim 1, wherein a secondary annular ridge of a height lower than the annular ridge is formed in the bearing surface.

7. The earth bolt according to claim 1, wherein the protrusions are formed on the crest of each turn of the screw thread so as to be arranged on a spiral about the axis of the threaded body.

8. The earth bolt according to claim 1, wherein the protrusions are bulges formed on opposite sides of each of depressions formed, respectively, by pressing parts of the crest of each turn of the screw thread of the threaded body.

* * * * *